Patented May 9, 1944

2,348,575

UNITED STATES PATENT OFFICE 2,348,575

TERPENE DERIVATIVES

Alfred L. Rummelsburg, Wilmington, Del., assignor to Hercules Powder Company, Wilmington, Del., a corporation of Delaware No Drawing. Application May 31, 1941,
Serial No. 396,215

16 Claims. (Cl. 260—16)

This invention relates to new compositions of matter and a method of producing the same; and more particularly, it relates to a new class of reaction products prepared by the reaction of a polyhydric alcohol and a condensation product of an acyclic terpene having three double bonds per molecule with maleic anhydride.

The reaction products embodying this invention may be produced by the esterification of a condensation product of an acyclic terpene having three double bonds per molecule with maleic anhydride. Such a condensate may be prepared by condensing the acyclic terpene in either its monomeric or polymeric form with maleic anhydride. Desirably, the condensation reaction will be carried out in the presence of heat. In addition, maleic acid may be equivalently employed in place of maleic anhydride.

In accordance with this invention, any acyclic terpene having three double bonds per molecule may be employed, as for example, allo-ocimene, ocimene, myrcene, etc. It is preferred to employ allo-ocimene since this compound, in addition to having three double bonds per molecule, has them in a triply conjugated system. Hereinafter, an acyclic terpene having three double bonds per molecule will be referred to for convenience as an acyclic terpene.

In preparing the condensate of a monomeric acyclic terpene and maleic anhydride, the reactants are intimately mixed and heated to a temperature of preferably from about 40° C. to about 60° C. Desirably, the heating is carried out using an air condenser. Inasmuch as equimolar proportions of the aforesaid materials react, it is preferred to employ approximately such proportions. However, other proportions may be used. Once the reaction starts, it is quite vigorous, and the reaction mixture must be removed from the source of heat at that stage. The mixture may then be further heated at a temperature of, for example, 190° C. and for a period of, for example, ½ hour or more. The unreacted materials may be removed by reduced pressure distillation; also, if desired, the product itself may be vacuum distilled for purification. Further purification of the product may be had by recrystallization from a suitable solvent, such as, petroleum ether, gasoline, benzene, etc.

In the particular instance where allo-ocimene is the acyclic terpene employed, the pure product is in the form of prismatic needles and has the following average characteristics:

Melting point (capillary tube) ____° C__ 80–82
Acid number (in pyridine) _____ 463–470

The condensation product of a monomeric acyclic terpene and maleic anhydride may also be produced by reacting maleic anhydride with a mixture of terpenes containing a substantial quantity of one of the acyclic terpenes hereinbefore mentioned. Such an acyclic terpene containing terpene mixture, for example, is formed when $\alpha$-pinene is pyrolyzed at suitable conditions of temperature and contact time of the $\alpha$-pinene vapor with the reaction tube. The acyclic terpene formed is allo-ocimene, and the concentration of allo-ocimene in the reaction mixture may range up to 40% or more depending upon the particular conditions of the reaction. In the product there will also be varied percentages of dipentene, $\alpha$-pinene, and other terpenes not having conjugated systems of double bonds. In fact, allo-ocimene is the only constituent present in substantial quantities which has a conjugated system of double bonds. When such a mixture containing allo-ocimene and unconjugated monocyclic terpenes is brought into contact with maleic anhydride in quantities sufficient to react with the allo-ocimene present in the mixture and at a temperature within the range of from about 60° C. to about 100° C., only the allo-ocimene present reacts in substantial amount. This reaction product, after removal of unreacted constituents as previously disclosed, may then be esterified in accordance with the processes of the invention.

Suitable pyrolysis of $\beta$-pinene, say at 400° C., yields a mixture of terpenes which may contain as much as 65 to 70% myrcene in addition to small amounts of l-limonene and other complex unidentifiable materials. Here again, the myrcene is the only terpene present having a conjugated system of double bonds. Hence, when such a mixture is brought into contact with maleic anhydride in quantities sufficient to react with the myrcene present and at a temperature within the range of from about 60° C. to about 100° C., only the myrcene present reacts in substantial amount. The reaction product, after removal of unreacted constituents, may be esterified in accordance with the processes of the invention.

Now, to prepare the condensate of a polymerized acyclic terpene with maleic anhydride, the reactants are intimately mixed and heated at an elevated temperature. Preferably, equi-molar proportions of the two materials will be employed, and the reaction mixture will be heated at a temperature within the range of from about 180° C. to about 250° C. for a period of from about 1 to about 8 hours. The polymeric acyclic terpene may be obtained from the monomeric form by any of the possible methods such as polymerization with sulfuric acid catalyst, polymerization with phosphoric acid catalyst as disclosed in my co-pending application for United States Letters Patent, Serial No. 396,213, filed May 31, 1941 now Patent No. 2,310,375, or polymerization with metal halides as catalyst as disclosed in my co-pending application for United States Letters Patent, Serial No. 396,212, filed May 31, 1941. When polymeric allo-ocimene, for example, is condensed with maleic anhydride, solid, light-colored resins result. These products may be purified by the use of reduced pressure to remove unreacted constituents such as maleic anhydride or polymerized allo-ocimene.

The preferred acyclic terpene polymers to employ in accordance with this invention are the substantially pure dimers. For example, when a liquid polymeric allo-ocimene consisting substantially entirely of the dimer is condensed with maleic anhydride according to the processes described supra, the purified product will be found to have the following average characteristics:

Color (rosin scale) _____ G to I+
Melting point (Hercules drop) _____ 80 to 90
Acid number (in pyridine) _____ 325

When, however, a polymeric form of allo-ocimene is used which contains substantial quantities of polymeric constituents higher than the dimer, and in particular when a solid polymer is used, the resulting condensate with maleic anhydride will have different characteristics depending upon the extent of polymerization of the allo-ocimene used.

By esterification with a polyhydric alcohol of any of the condensates disclosed heretofore, a variety of esters may be produced in accordance with this invention. The esterification is contemplated by various processes, as under atmospheric or other pressure, with or without the use of an esterification catalyst. Further, the esters may be prepared with the use of any polyhydric alcohol, such as, ethylene glycol, propylene glycol, glycerol, pentaerythritol, diethylene glycol, triethylene glycol, trimethylene glycol, diglycerol, inositol, butylene glycol, erythrol, pentitol, hexitol, heptitol, etc.; also substituted polyhydric alcohols, such as, glycerol monoethyl ether, glycerol monophenyl ether, etc., are all contemplated within the scope of this invention.

The use of mixtures of more than one alcohol for the esterification is also contemplated. Thus, a monohydric alcohol such as butyl alcohol and a polyhydric alcohol such as glycerol may be used in combination to give mixed esters. The combination in such a case may be carried out in any manner such as partial esterification first with butyl alcohol then completion of the esterification with glycerol, or vice versa.

If desired, in the production of the esters, an esterification catalyst may be employed and as such may be used, for example, sulfuric acid, phosphoric acid, para-toluene sulfonic acid, etc. However, when the temperature employed is 200° C. or above, the reaction can be carried out without the use of a catalyst. A closed system may be employed if the reaction temperature is above the boiling point of the alcohol.

In the preparation of a polyhydric alcohol ester of a condensation product of an acyclic terpene with maleic anhydride in accordance with this invention, the esterification will be carried out at temperatures within the range of from about 150° C. to about 325° C., and preferably from about 175° C. to about 275° C. The use of an inert atmosphere during the esterification will facilitate obtaining the palest products. For example, carbon dioxide, nitrogen, etc., may be used for this purpose.

After the completion of the esterification reaction any unreacted polyhydric alcohol or other volatile matter may be removed by any convenient means, as for example by distillation under reduced pressure, blowing with an inert gas, as carbon dioxide, nitrogen, etc.

A suitable modifying agent may be employed in the esterification, if desired. Such desirable agents include monobasic acids, such as, for example, linseed oil fatty acids, rosin, etc. These modifying agents are added to the reactants during esterification; they are useful in imparting desirable characteristics to the finished product.

As illustrations of the practical production of esters in accordance with this invention, the following examples are given. All parts and percentages herein are by weight unless otherwise specified.

Example 1

About 95 parts by weight of the product resulting when monomeric allo-ocimene is condensed with maleic anhydride, and 24 parts by weight of ethylene glycol were heated together with good agitation at a temperature of from about 208° C. to 210° C. for 8 hours, removing water as it was formed. Excess ethylene glycol was removed by applying reduced pressure. As a result of this treatment, a hard resin was formed which had an acid number of 32 and a drop melting point of 80° C.

Example 2

Twenty parts by weight of the product resulting when monomeric allo-ocimene is condensed with maleic anhydride, and 23 parts by weight of linseed oil fatty acids were heated to 150° C. with agitation until a homogeneous mixture resulted. 8.3 parts by weight of glycerol were then added, and the mixture heated for 7 hours at a temperature of 220° C. The pressure was reduced to 20 mm. to remove unreacted glycerol. The resulting ester was a viscous oil which had an acid number of 17.

Example 3

A mixture of 20 parts by weight of the product resulting when monomeric allo-ocimene is condensed with maleic anhydride, and 59 parts by weight of wood rosin were heated at 150° C. with agitation until a homogeneous mixture resulted. The sample of wood rosin used had an acid number of 163, a color of I, and a drop melting point of 81° C. About 17.7 parts by weight of glycerol were added and the mixture rapidly heated at a temperature of from 265° C. to 270° C. for 7 hours. The pressure was reduced to 20 mm. to remove the unreacted glycerol. The resinous product had an acid number of 3.5 and a drop melting point of 88° C.

There follow several examples which illustrate the results obtained when an allo-ocimene-containing terpene mixture obtained by the pyrolysis of α-pinene is used in the preparation of the allo-ocimene-maleic anhydride condensate. It should be noted that two types of condensation products result, depending upon whether a slight excess of pyrolyzed α-pinene or a slight excess of maleic anhydride is used. Example 4, to follow, illustrates the use of a slight excess of pyrolyzed α-pinene, whereas Example 5 illustrates the use of a slight excess of maleic anhydride. The existence of an excess of either of the reactants is based on the amount of allo-ocimene present.

Example 4

Three hundred twenty-eight parts of pyrolyzed

α-pinene containing 40% allo-ocimene and 95 parts of maleic anhydride were heated at 100° C. in an atmosphere of $CO_2$ for 12 hours. The reaction mixture was distilled in vacuo to remove any unreacted constituents, leaving a residue of 202 parts of allo-ocimene-maleic anhydride condensate which had an acid number (pyridine) of 470, a color of K–N on the rosin color scale, and a thiocyanate value of 80. This condensate and 75 parts by weight of ethylene glycol were heated together with agitation at a temperature of 210–215° C. for 6½ hours. Excess glycol was removed by applying reduced pressure. The resulting resin had an acid number of 36, a drop melting point of 80° C., and a color of N on the rosin scale. It was both toluene- and acetone-soluble.

Example 5

Two hundred fifty parts of pyrolyzed α-pinene and 200 parts of maleic anhydride were heated at 100° C. in an atmosphere of $CO_2$. The reaction mixture was distilled in vacuo to remove unreacted constituents. The resulting product had an acid number (pyridine) of 500–520, a color of I–K, a thiocyanate value of 55, and a drop melting point of 45° C. To 202 parts of this condensate were added 75 parts of ethylene glycol. The mixture was heated with agitation at a temperature of 210–215° C. for 6 hours. The product obtained had an acid number of 36, a drop melting point of 92° C., and a color of K on the rosin scale. The product was tough, non-friable, toluene-insoluble, and acetone-soluble resin.

The following examples illustrate the preparation of polyhydric alcohol esters according to this invention using a condensate prepared by reacting polymerized allo-ocimene and maleic anhydride.

Example 6

A condensation product was prepared by reacting a polymerized allo-ocimene, consisting substantially entirely of the dimer, with maleic anhydride at a temperature of 210–220° C. for a period of 2 hours. Distillation of the reaction mixture at a temperature of 210–240° C. and at 10 mm. pressure left a product having an acid number (pyridine) of 330, a drop melting point of 83° C., and a color on the rosin scale of G+. To 100 parts of this condensate 25 parts of ethylene glycol were added, and the mixture heated at 195–210° C. for a period of 6 hours. Unreacted constituents were removed by distillation at a temperature of 230° C. and at 15 mm. pressure, leaving an ester having the following characteristics: acid number, 45; drop melting point, 112° C.; color on the rosin scale, H; and a cure time of 35 seconds.

Example 7

A condensation product of polymerized allo-ocimene consisting substantially entirely of the dimer, with maleic anhydride was prepared by heating the mixture under an air condenser to 200° C. over a period of 15 minutes. Heating was continued for 55 minutes, at the end of which period the temperature had reached 250° C. The purified condensate had an acid number (pyridine) of 310, a drop melting point of 88° C., and a color on the rosin scale of G+. To 139 parts of this condensate 337 parts of N wood rosin and 66.2 parts of glycerol were added, and the mixture heated under air reflux and $CO_2$ agitation to 150° C. One hundred fifteen parts of glycerol were added, the temperature was raised to 265–270° C., and the heating continued at that temperature for 7 hours. The excess glycerol was removed under vacuo to give a resinous ester having an acid number of 8.5, a drop melting point of 112° C., and a color (Lovibond) of 80A+5.0R.

Example 8

Two hundred thirty-two parts of the same condensate as was used in Example 7, 239 parts of linseed oil fatty acids, and 69.5 parts of glycerol were heated at 220° C. in an atmosphere of $CO_2$ and under air reflux for about 6½ hours. The unreacted constituents were removed by reduced pressure distillation to yield a resin having an acid number of 22.5, and a color (Lovibond) of 80A+1.0R.

The esters produced in accordance with this invention will be found to possess extremely good heat hardening properties. This is a consequence of their high unsaturation. Theoretically, each ester will contain two double bonds for each monomeric acyclic terpene-maleic anhydride condensate which took part in the reaction. Hence, films containing these esters in substantial quantities harden up readily upon being held at elevated temperatures. In addition, these esters because of their increased unsaturation, will co-polymerize readily with heat reactive phenolic resins, styrene, vinyl acetate, and also esters of acrylic and methacrylic acids. The result is a new series of interesting copolymers.

These new esters will further be found suitable as ingredients in coating compositions, such as, lacquers, varnishes, etc., together with various well-known ingredients thereof, such as, solvents, nitrocellulose, drying oils, plasticizers, gums, resins, etc. They may also be incorporated in pressure-sensitive adhesives as the rubber emulsifying ingredient, to produce quite satisfactory products.

It will be understood that the details and examples given hereinbefore are illustrative only and are in no way limiting on my invention as broadly described hereinbefore and in the appended claims.

This application is a continuation-in-part of my application for United States Letters Patent, Serial No. 370,667, filed December 18, 1940.

What I claim and desire to protect by Letters Patent is:

1. A reaction product of a polyhydric alcohol and a condensation product of maleic anhydride with a material selected from the group consisting of the monomers and polymers of acyclic terpenes having three double bonds per molecule, said esterification reaction being carried out in the presence of heat at a temperature from about 150° C. to about 325° C.

2. A reaction product of a polyhydric alcohol and a condensation product of maleic anhydride with an acyclic terpene having three double bonds per molecule, said esterification reaction being carried out in the presence of heat at a temperature from about 150° C. to about 325° C.

3. A reaction product of a polyhydric alcohol and a condensation product of maleic anhydride with allo-ocimene, said esterification reaction being carried out in the presence of heat at a temperature from about 150° C. to about 325° C.

4. A reaction product of an aliphatic glycol and a condensation product of maleic anhydride with allo-ocimene, said esterification reaction being carried out in the presence of heat at a temperature from about 150° C. to about 325° C.

5. A reaction product of ethylene glycol and a condensation product of maleic anhydride with allo-ocimene, said esterification reaction being carried out in the presence of heat at a temperature from about 150° C. to about 325° C.

6. A reaction product of glycerol and a condensation product of maleic anhydride with allo-ocimene, said esterification reaction being carried out in the presence of heat at a temperature from about 150° C. to about 325° C.

7. A reaction product of a polyhydric alcohol and a condensation product of maleic anhydride with a polymer of an acylic terpene having three double bonds per molecule, said esterification reaction being carried out in the presence of heat at a temperature from about 150° C. to about 325° C.

8. A reaction product of a polyhydric alcohol and a condensation product of maleic anhydride with polymerized allo-ocimene, said esterification reaction being carried out in the presence of heat at a temperature from about 150° C. to about 325° C.

9. A reaction product of glycerol and a condensation product of maleic anhydride with polymerized allo-ocimene, said esterification reaction being carried out in the presence of heat at a temperature from about 150° C. to about 325° C.

10. A reaction product of glycerol and a condensation product of maleic anhydride with dimeric allo-ocimene, said esterification reaction being carried out in the presence of heat at a temperature from about 150° C. to about 325° C.

11. The method of producing a new composition of matter which includes reacting a condensation product of maleic anhydride and a material selected from the group consisting of the monomers and polymers of acyclic terpenes having three double bonds per molecule, with a polyhydric alcohol in the presence of heat.

12. The method of producing a new composition of matter which includes reacting a condensation product of maleic anhydride and a material selected from the group consisting of the monomers and polymers of acylic terpenes having three double bonds per molecule, with a polyhydric alcohol at a temperature between about 150° C. and about 325° C.

13. The method of producing a new composition of matter which includes reacting a condensation product of maleic anhydride and a material selected from the group consisting of the monomers and polymers of acyclic terpenes having three double bonds per molecule, with a polyhydric alcohol at a temperature between about 175° C. and about 275° C.

14. A coating composition comprising a solvent and a reaction product of a polyhydric alcohol and a condensation product of maleic anhydride with a material selected from the group consisting of the monomers and polymers of acyclic terpenes having three double bonds per molecule, said esterification reaction being carried out in the presence of heat at a temperature from about 150° C. to about 325° C.

15. A lacquer composition comprising a solvent, nitrocellulose, and a reaction product of a polyhydric alcohol and a condensation product of maleic anhydride with a material selected from the group consisting of the monomers and polymers of acyclic terpenes having three double bonds per molecule, said esterification reaction being carried out in the presence of heat at a temperature from about 150° C. to about 325° C.

16. A varnish composition comprising a solvent, a drying oil, and a reaction product of a polyhydric alcohol and a condensation product of maleic anhydride with a material selected from the group consisting of the monomers and polymers of acyclic terpenes having three double bonds per molecule, said esterification reaction being carried out in the presence of heat at a temperature from about 150° C. to about 325° C.

ALFRED L. RUMMELSBURG.